June 5, 1923.

D. G. SELL

DRIP COFFEEPOT

Filed July 10, 1922

Inventor
D. G. Sell

By Philip A. M. Sell
Attorney

Patented June 5, 1923.

1,457,317

UNITED STATES PATENT OFFICE.

DANIEL G. SELL, OF KANSAS CITY, MISSOURI.

DRIP COFFEEPOT.

Application filed July 10, 1922. Serial No. 574,050.

*To all whom it may concern:*

Be it known that DANIEL G. SELL, citizen of the United States, residing at Kansas City, in the county of Jackson and State of Missouri, has invented certain new and useful Improvements in Drip Coffeepots, of which the following is a specification, reference being had therein to the accompanying drawings.

The invention relates to drip coffee pots and has for its object to provide a device of this character wherein steam from water within a coffee pot passes upwardly into contact with the bottom of a cold water pan, condenses and drops downwardly into a coffee container and passes through the coffee into the coffee pot. Also to so construct the same that it may be easily and quickly attached to a conventional form of coffee pot.

A further object is to provide a drip coffee making device comprising a receptacle for the reception of water, preferably a conventional form of coffee pot, said receptacle having detachably supported on its upper end a casing having an opening in the bottom thereof, and lugs adjacent the opening and an auxiliary casing formed in two sections and supported on the lugs and having its lower end extending through the opening in the main casing and provided with a fabric member in which coffee may be placed. The downwardly extending portion of the auxiliary casing being spaced from the wall of the opening in the bottom of the main casing and a cold water pan supported on the upper end of the main casing and having its lower end extending into the upper end of the auxiliary casing and out of engagement therewith, and forming means for condensing steam.

A further object is to provide the bottom of the cold water pan with a roughened surface whereby condensation will take place over its entire surface, and water dropped over the entire bulk of coffee. Also to provide a steam exhaust pipe extending upwardly through the water receiving pan and forming means for insuring a circulation of steam.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1:
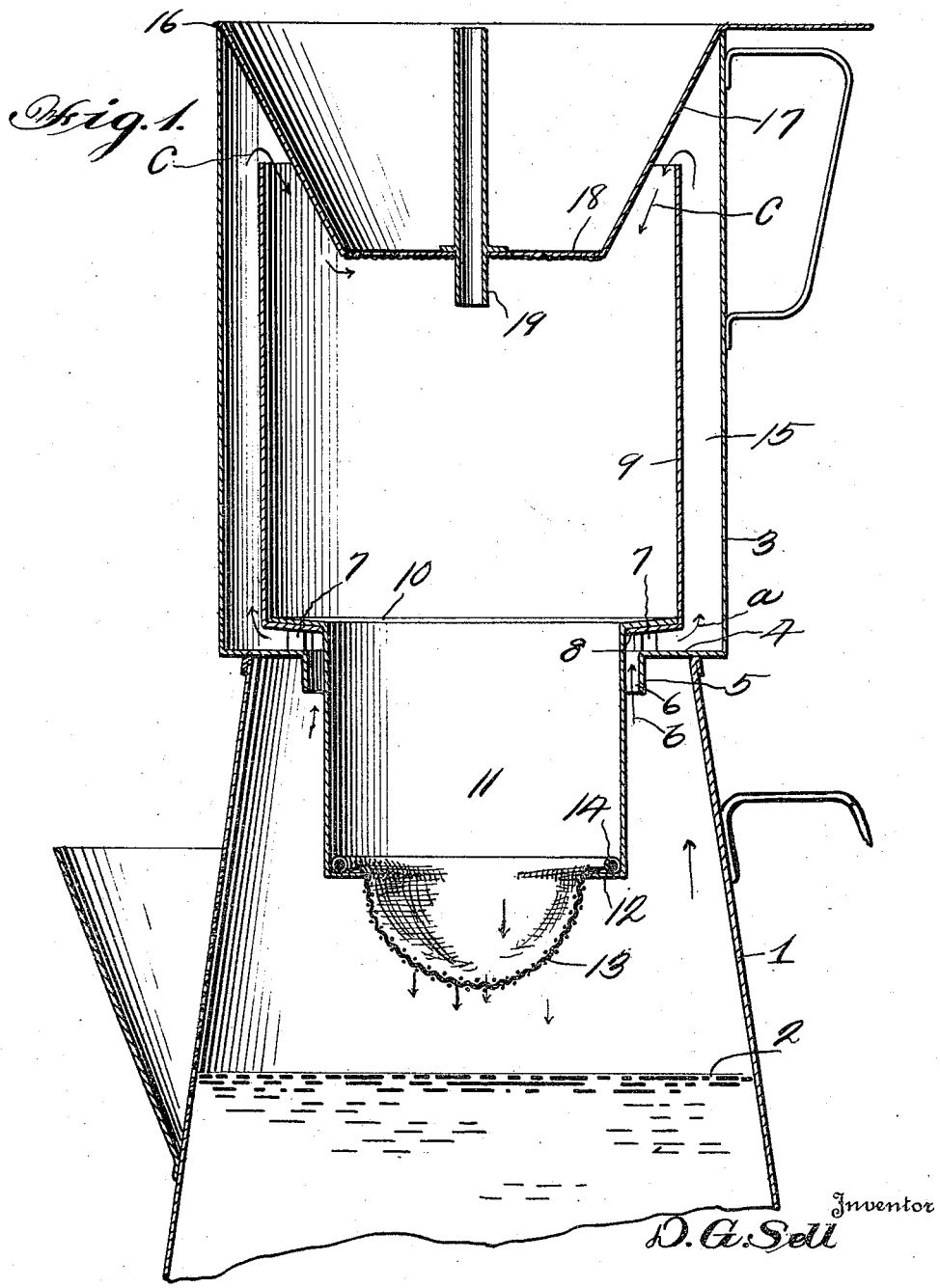
Figure 1 is a vertical sectional view through the device showing the same supported on a conventional form of coffee pot.
Figure 2:
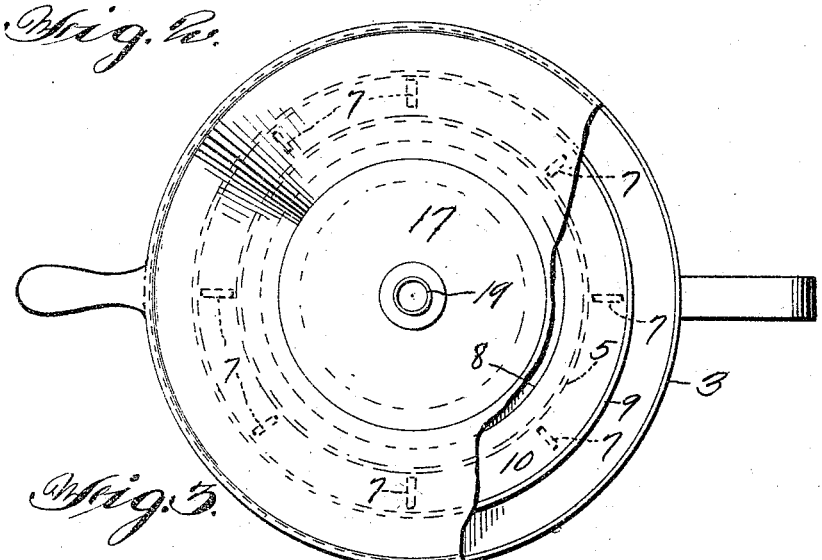
Figure 2 is a top plan view of the device.
Figure 3:
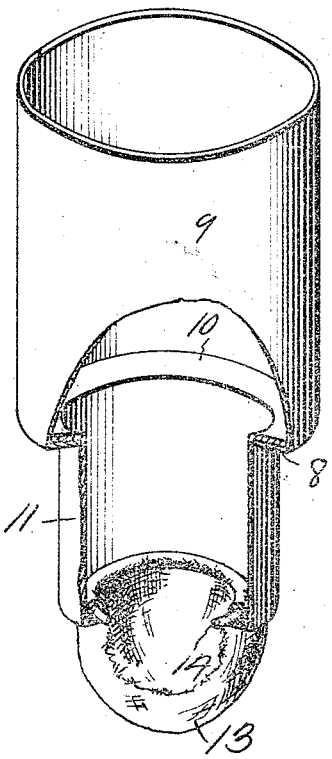
Figure 3 is a perspective view of the auxiliary casing, part being broken away to better show the structure.

Referring to the drawing, the numeral 1 designates a conventional form of coffee pot, in which water 2 is placed, the coffee pot being adapted to be disposed on a stove or the like for heating the water. Supported on the upper end of the coffee pot 1 is the main casing 3, the lower end of which is provided with a horizontally disposed flange 4, which rests on the upper end of the coffee pot 1 and is held against lateral displacement by means of the annular flange 5, which extends downwardly into the pot 1 and forms an opening 6 in the bottom of the main casing 3. Extending upwardly from the flange 4 are spaced lugs 7, which lugs engage the downwardly and inwardly inclined flange 8 of the auxiliary casing 9 and support the same spaced from the flange 4 in such a manner that steam may pass in the direction of the arrow *a*. Supported on the flange 8 of the auxiliary casing 9 by means of a flange 10 is a coffee receiving cup 11, which extends downwardly axially through the opening 6 and spaced from the wall thereof in such a manner that steam may pass from the chamber of the pot 1 in the direction of the arrow *b*. The lower end of the coffee receiving cup 11 is provided with a horizontally disposed flange 12, which supports the coffee strainer 13, preferably formed of fabric and supported by a ring which rests on the flange 12. The outer periphery of the auxiliary casing 9 is spaced from the inner wall of the main casing 3 thereby forming an annular steam passage 15 through which steam passes upwardly from the chamber of the pot 1. The upper end of the auxiliary casing 9 is lower than the upper end of the main casing 3, the purpose of which will presently appear.

Supported on the upper end of the main casing 3 by means of its flange 16 resting on the upper end of the casing 3 is a cold water pan 17, which pan preferably tapers downwardly and inwardly and is provided with a flat bottom 18 disposed within the upper end of the auxiliary casing 9, but spaced from the wall thereof, thereby forming an annular passage in communication with the annular steam passage 15, whereby steam may pass from the passage 15 in the direction of the arrows c. The steam generated in the pot 1 passes downwardly through the bag 13 and coffee therein, engaging the roughened bottom 18 of the cold water pan 17, where it condenses and the drops accumulate on the roughened surface of the bottom in such a manner that they drop from all parts thereof into the cup 11 thereby insuring the passage of distilled water through the entire body or bulk of coffee insuring the uniform extraction from all of the coffee. To insure circulation by allowing the exhaust of a limited amount of steam, a pipe 19 is provided, which pipe extends upwardly through the bottom of the cold water pan 17 and discharges to the atmosphere.

From the above it will be seen that a coffee making receptacle is provided which may be easily and quickly attached to a conventional form of coffee pot, and that the device may be easily and quickly assembled or disassembled for use or cleaning purposes. It will also be seen that means is provided for insuring the dropping of condensed steam onto the entire bulk of coffee thereby allowing and insuring the extraction of all of the strength from the coffee.

Figure 4:
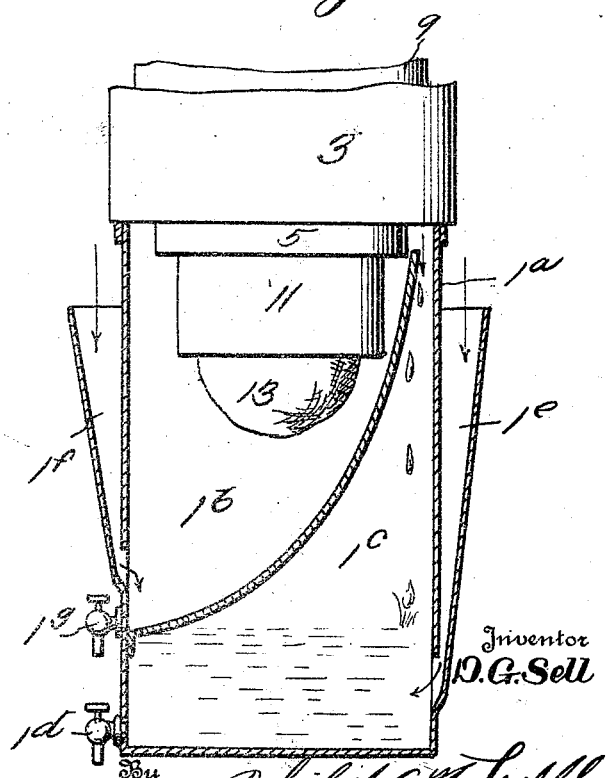
Figure 4 is a sectional view through a combined water still and coffee pot, showing the device applied thereto.

Referring to Figure 4 wherein the device is shown as supported on a combined coffee pot and still, the device works in substantially the same manner as that shown in Figure 1, however the receptacle 1ª is divided into a coffee chamber 1ᵇ and a water chamber 1ᶜ, the water in the water receptacle 1ᶜ vaporizing and condensing, thereby forming a still, and the water may be used by opening the faucet 1ᵈ. Water may be added to the receptacle 1ᶜ by pouring the same into the passage 1ᵉ and additional water may be added to coffee within the chamber 1ᵇ by pouring the same through the passage 1ᶠ. When it is desired to draw coffee from the chamber 1ᵇ, the faucet 1ᵍ is opened.

The invention having been set forth what is claimed as new and useful is:—

1. A coffee making utensil comprising a water receptacle adapted to be placed over a fire and having its upper end opened, a main receptacle supported on the upper end of the water receiving receptacle and having an opening in its bottom, an auxiliary receptacle disposed within the main receptacle and smaller than the main receptacle, supporting lugs for supporting the bottom of the auxiliary receptacle spaced from the bottom of the main receptacle, a coffee receiving cup disposed within the auxiliary receptacle and extending downwardly through the opening in the bottom of the main receptacle into the water receptacle and a cold water pan supported on the upper end of the main receptacle and extending downwardly into the upper end of the auxiliary receptacle and spaced from the walls thereof.

2. A coffee making utensil comprising a water receiving receptacle, a main casing supported on a water receiving receptacle and having an opening in the bottom thereof, an auxiliary receptacle disposed within the main receptacle and extending through the opening in the bottom thereof and spaced from the walls of the main receptacle, a coffee receiving bag in the bottom of the auxiliary receptacle, a cold water receiving pan supported on the upper end of the main receptacle and extending downwardly into the upper end of the auxiliary receptacle and spaced from the walls thereof, the bottom of said cold water pan being roughened.

3. A coffee making utensil comprising a water receiving receptacle, a main casing supported on the water receiving receptacle and having an opening in the bottom thereof, upwardly extending lugs carried by the main receptacle, an auxiliary casing supported on said lugs, a removable coffee receiving cup disposed in the lower end of the auxiliary receptacle, a cold water receiving pan supported on the upper end of main casing and extending downwardly into the upper end of the auxiliary casing, the bottom of the water receiving pan being roughened, and a pipe extending upwardly through the water receiving pan.

4. The combination with a coffee pot, of a main casing supported thereon and having an opening in the bottom thereof, upwardly extending lugs carried by the bottom of the main casing, an auxiliary casing within the main casing and spaced from the walls thereof, the lower end of said auxiliary casing being provided with an inwardly and downwardly extending flange resting on the lugs, a coffee receiving receptacle supported on the flange of the auxiliary casing and extending downwardly into the coffee pot, a water receiving pan supported on the upper end of the main casing and extending downwardly into the upper end of the auxiliary casing, the bottom of the water receiving pan being roughened, and a pipe extending upwardly through the bottom of the water receiving pan.

In testimony whereof I hereunto affix my signature.

DANIEL G. SELL.